United States Patent [19]

Magill et al.

[11] 4,333,489

[45] Jun. 8, 1982

[54] SPRING-MOTOR DUAL-FUNCTIONING MECHANISM

[75] Inventors: Robert J. Magill, Whitstable; Donald J. Lockley; Richard J. Perrin, both of Herne Bay, all of England

[73] Assignee: Actionair Equipment Limited, Whitstable, England

[21] Appl. No.: 73,366

[22] Filed: Sep. 7, 1979

[30] Foreign Application Priority Data

Sep. 11, 1978 [GB] United Kingdom ............... 36293/78

[51] Int. Cl.³ .................... F16K 17/38; F16K 17/40
[52] U.S. Cl. .......................................... 137/77; 49/7; 185/40 R; 185/40 B; 137/315
[58] Field of Search ............... 98/86, 101, 113, 121 A; 49/7, 8, 74; 137/72, 75, 77, 601, 315; 160/1; 185/40 R, 43, 40 B; 169/42; 292/81, DIG. 66

[56] References Cited

U.S. PATENT DOCUMENTS

| | | | |
|---|---|---|---|
| 1,365,724 | 1/1921 | Phillips | 185/40 R |
| 1,752,181 | 3/1930 | Johnson | 185/40 R |
| 2,904,956 | 9/1959 | Zenor | 185/40 R |
| 2,961,068 | 11/1960 | Yarrick et al. | 185/40 R |
| 3,352,468 | 11/1967 | Shoemaker | 185/40 R |
| 3,395,687 | 8/1968 | Harkness | 185/43 |
| 3,491,602 | 1/1970 | New | 185/40 R |
| 3,543,440 | 12/1970 | Kurz | 49/7 |
| 3,557,497 | 1/1971 | Schafer et al. | 49/7 |
| 3,652,815 | 3/1972 | Davies | 185/40 R |
| 3,689,720 | 9/1972 | Patel | 185/40 R |
| 3,996,952 | 12/1976 | Root | 137/77 |
| 4,113,063 | 9/1978 | Troy | 185/40 R |

Primary Examiner—George L. Walton
Attorney, Agent, or Firm—Berman, Aisenberg & Platt

[57] ABSTRACT

For releasing and resetting a releasable and resettable device: a spring-motor dual-functioning mechanism comprising release means to release the device, a spring motor to reset the device, and spring-winding means to rewind the spring motor, the spring motor storage power being sufficient for at least two complete resetting operations of the mechanism.

10 Claims, 8 Drawing Figures

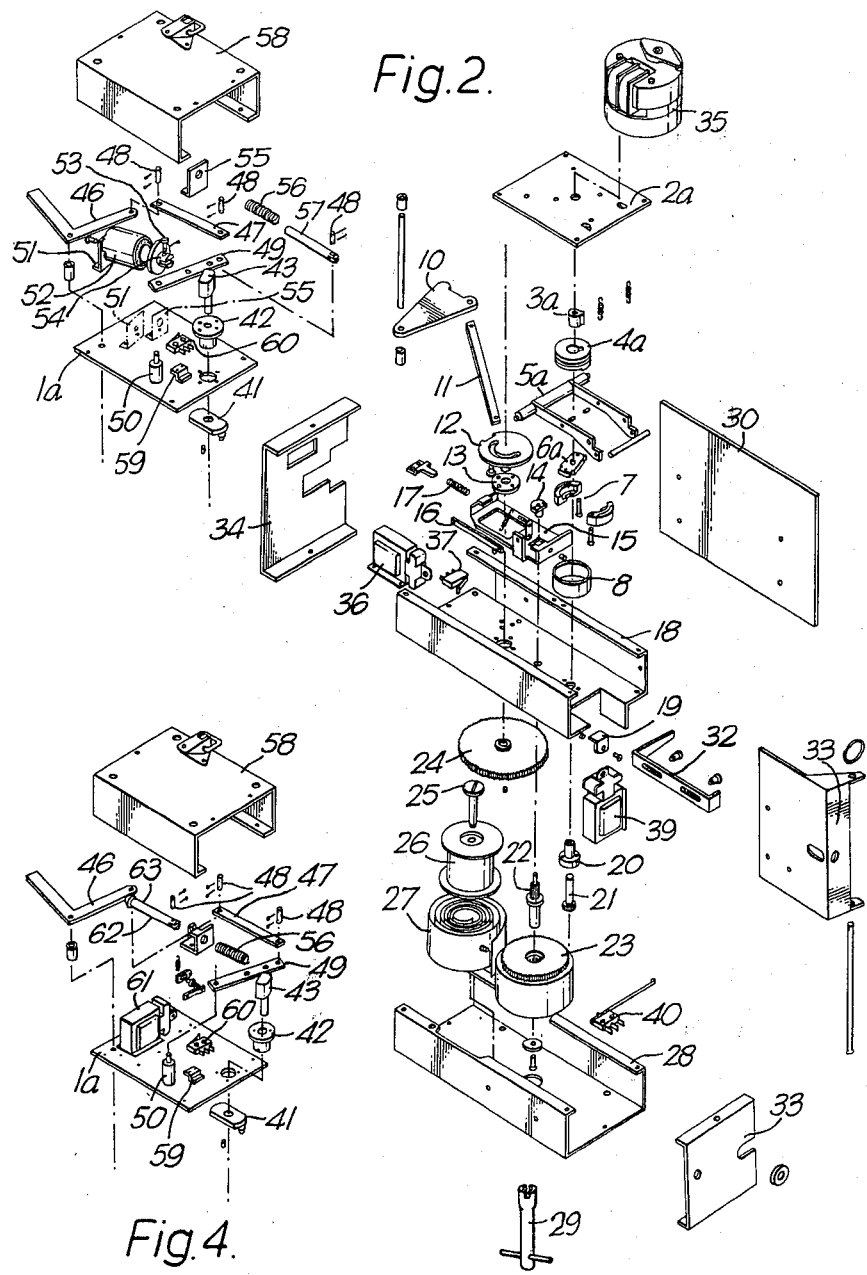

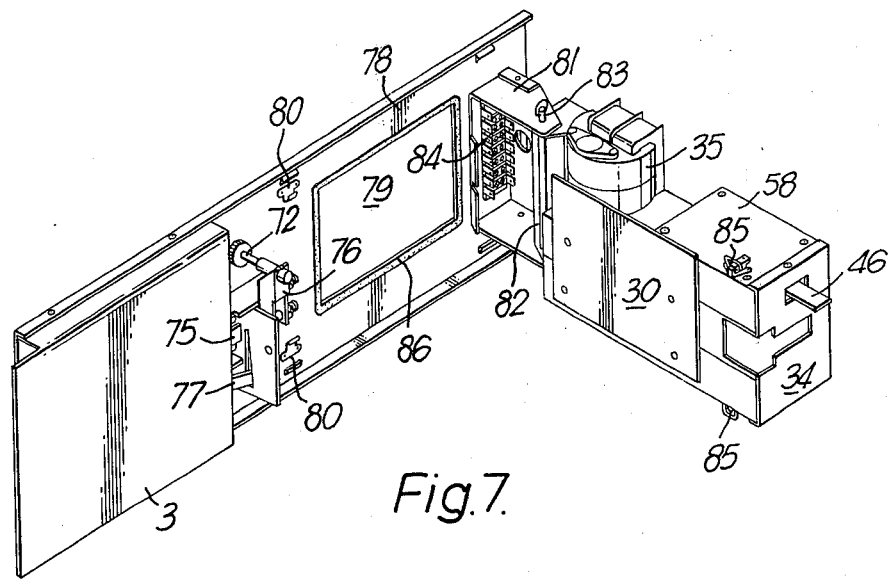
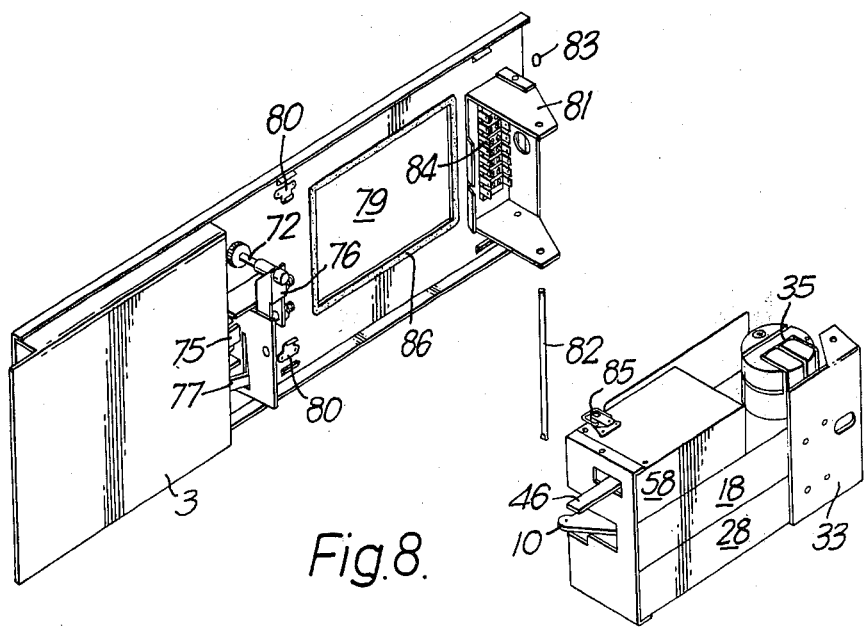

SPRING-MOTOR DUAL-FUNCTIONING MECHANISM

This invention relates to a mechanism for operating devices such as fire and/or smoke dampers, doors, hatches, vents, traps, valves and other devices having components which are movable between at least two positions—for example, a closed position and an open position.

It has long been the practice to use electrical, electro-mechanical, pneumatic or hydraulic mechanisms to operate components which are movable between at least two positions. All such mechanisms have, however, the serious disadvantage that failure of the electrical supply or failure of the pneumatic or hydraulic lines will result in failure of the mechanism itself. This can be critical, especially in the case of fire and/or smoke dampers where the safety of a building against damage or destruction by fire may be dependent on reliable operation at all times of the fire and/or smoke dampers installed in it.

With these considerations in mind, the aim of the present invention is to provide an operating mechanism which is able to store power and which is not reliant on outside sources of power for its operation.

Accordingly, the invention is directed to a spring-motor dual-functioning mechanism incorporating release means which are actuated electrically, pneumatically or manually, and a spring-motor which is actuated electrically, pneumatically or manually, the former to release and the latter to reset a releasable and resettable device which the spring-motor mechanism is arranged to actuate during use thereof, the mechanism further comprising spring-winding means which are actuated electrically, pneumatically or manually to rewind the spring motor, the spring motor storage power being sufficient for at least two complete resetting operations of the mechanism.

The advantage of the mechanism is that, as the electric or pneumatic actuator which will normally form part of the mechanism only requires and uses power for automatic rewinding of the spring, the spring motor is able to carry out two resetting operations even in the event of electrical or pneumatic failure.

The releasable and resettable device can be a fire and/or smoke damper, a door, a hatch, a vent, a trap, a valve or some other device having a component which is movable between at least two positions.

The release operation can be actuated through (a) an energised DC electro-magnet, operating only when the DC electrical supply is interrupted either as, say, a function of a smoke detection system, or due to supply failure, with the spring motor mechanism subsequently resetting the electro magnet; (b) a deenergised AC solenoid operating only on receipt of an electrical signal; or (c) a spring-return air cylinder operating only on pneumatic power loss.

A compact surface-mounted housing will generally be provided to enclose the complete mechanism assembly which is pre-wired or pre-piped, factory-tested and made ready for operation with the supply terminals conveniently located, including the facility, when electrically actuated, of further connection to a remote visual display lamp indicator on a master console.

The spring-motor dual functioning mechanism operates in any plane with a choice of positioning of linkage connecting rods from the side or underneath the mechanism, and it also has the additional facilities of external manual override and key-operated external spring rewind for mechanical site commissioning including linkage connecting rods adjustment without the availability of electric or pneumatic power.

An example of mechanism in accordance with the invention is shown in the accompanying drawings, in which:

FIG. 2 is an exploded perspective view of the mechanism with the housing removed;

FIG. 4 is an exploded perspective view of a modification to the mechanism shown in FIG. 2;

FIG. 7 is a view similar to FIG. 6 showing the manner in which the mechanism can be swung away from the duct; and FIG. 8 is a view similar to FIGS. 6 and 7 showing the way in which the mechanism can be removed from the duct.

Figure 1:
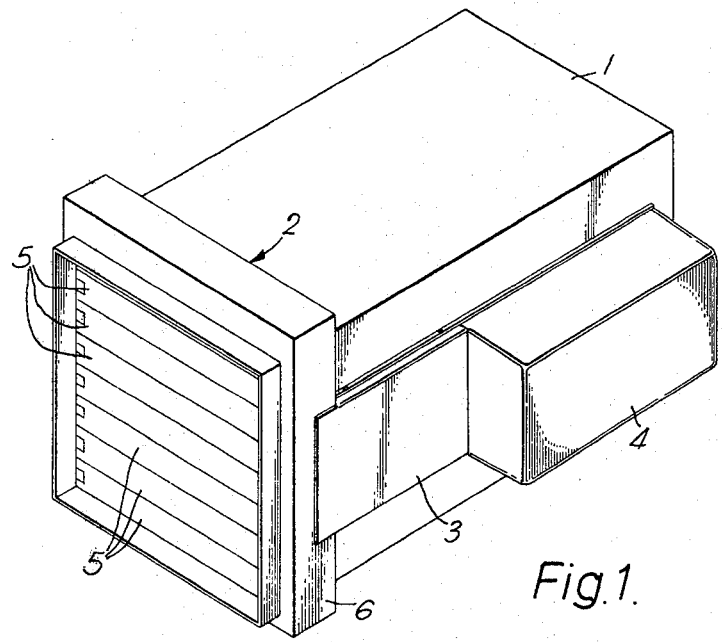
FIG. 1 is a perspective view of the motor in its housing mounted on the side of a duct incorporating a fire and/or smoke damper.

The assembly shown in FIG. 1 comprises a duct 1 incorporating a fire and/or smoke damper 2 connected to be controlled, via a linkage (not shown) behind a cover plate 3, by a spring-motor mechanism (not shown in FIG. 1) inside a housing cover 4. The particular damper shown comprises lines of parallel spring-loaded blades 5 which are rotatable about respective longitudinal axes to open or close a rectangular passage formed by a frame 6 in which the blades are supported.

The spring-motor mechanism is shown in FIG. 2, and comprises a release operation base plate 1a, an actuator mounting plate 2a, a clutch driving dog 3a, a clutch sliding dog 4a, a clutch operating lever assembly 5a, a clutch-driven dog and stop pin 6a, governer shoes and pivot pins 7, and a governer housing 8. In addition, it includes a resetting sector plate 10, a main drive link 11, a main drive cam 12, a main drive bearing 13, an intermediate drive bearing 14, a resetting slide 15, a resetting solenoid link 16, a resetting slide return spring 17, an upper chassis 18, a clutch operating solenoid link 19, a governer bearing bush 20, a governer-driven gear and shaft 21, an intermediate gear and shaft 22, a spring torque drum and roller clutch 23, and a main driven gear 24.

The mechanism further includes a retaining screw 25, a spring storage drum 26, a constant-torque spring 27, a lower chassis 28, a spring rewind key 29, a housing base plate 30, a manual override 32, a chassis end cover (right hand) 33 and a chassis end cover (left hand) 34, an electrical geared motor or actuator 35, a resetting solenoid 36, a resetting micro-switch 37, a clutch operating solenoid 39, a spring overwind-prevention micro-switch 40, a release reset crank 41, a release reset cam bearing 42, a release reset cam 43, an L-shaped release lever 46, and a release coupling link 47.

Also provided in the mechanism of FIG. 2 are pivot pins 48, an armature link 49, a release base plate pivot pin 50, an electro-magnet bracket 51, an electro-magnet 52, an armature pivot pin 53, an armature 54, a release spring guide bracket for the electro-magnet 52, a release spring 56, a release spring guide rod 57 for the electro-magnet 52, a release operation cover 58, a remote visual display lamp micro-switch bracket 59, and a remote visual display lamp micro-switch 60.

In the modification shown in FIG. 4, there is a release solenoid 61, a release spring guide bracket assembly 62, and a release spring guide rod 63.

The operation of the mechanism shown in FIG. 2 is as follows.

During the resetting sequence, the constant torque spring 27 is wound onto the spring torque drum 23 by the geared actuator 35 via the clutch driving dog 3 and the clutch sliding dog 4 which is moved into engagement with the clutch driven dog 6 by the clutch operating lever assembly 5 through the governer-driven gear and shaft 21 engaging with the integral gear of the spring torque drum 23. The complete clutch assembly is controlled by the clutch-operating solenoid 39 via the clutch-operating solenoid link 19. The clutch operating solenoid 39 and the geared actuator 35 are energised via the resetting micro-switch 37 and the spring overwind-prevention micro-switch 40 which are normally closed.

When the constant torque spring 27 is fully wound onto the spring torque drum 23, the spring overwind-prevention micro-switch 40 changes state and cuts electrical power to the clutch-operating solenoid 39 and the geared actuator 35. During winding, a unidirectional roller clutch incorporated in the spring torque drum 23 prevents the rewind motion from being transmitted through the intermediate gear 22. When winding is complete, as decided by the spring overwind-prevention micro-switch 40, the stop pin contained within the clutch driven dog engages the spring-loaded pawl of the resetting slide 15 to prevent unwinding.

When output power is required, pulse energisation of the resetting solenoid 36 causes the resetting slide 15 to be moved to the left via the resetting solenoid link 16 disengaging the spring-loaded pawl of the resetting slide 15 and, at the same time, moving the tongue on the left of the resetting slide 15 away from the main drive cam 12. The spring torque drum 23 will now rotate and transmit power through its uni-directional roller clutch to the intermediate gear and shaft 22 to the main driven gear 24 which is mounted on the integral shaft of the main drive cam 12. The rate at which the main drive cam 12 revolves is controlled by a centrifugal governer assembly comprising the governer shoes and pivot pins 7 and the governer housing 8, with the governer shoes 7 pressed by centrifugal force against the governer housing 8 and the speed of revolution dependent on the coefficient of friction of the lining material used on the governer shoes 7 and the diameter of the governer housing 8. This can be pre-set for any given application.

After one complete revolution of the main drive cam 12, the tongue on the resetting slide 15 re-enters the indent on the main drive cam 12 due to the pressure of the resetting slide return spring 17 allowing the stop pin of the clutch driven dog 6 to re-engage the spring-loaded pawl of the resetting slide 15, thereby stopping any further motion.

When the resetting slide 15 moved to the left, the resetting micro switch 37 changed state, cutting power to the geared actuator 35, and prevented rewind action during the output power cycle.

The rotation of the main drive cam 12 draws back the main drive link 11 which rotates the sector plate 10 clockwise into the upper chassis 18. The main drive link 11 is pivoted on the release crank 41 engaging in the 180° radial slot in the main drive cam 12 with the slot enabling any overriding pressure back transmitted via the sector plate 10 to take precedence over speed of rotation after 180° of movement.

Figure 3:
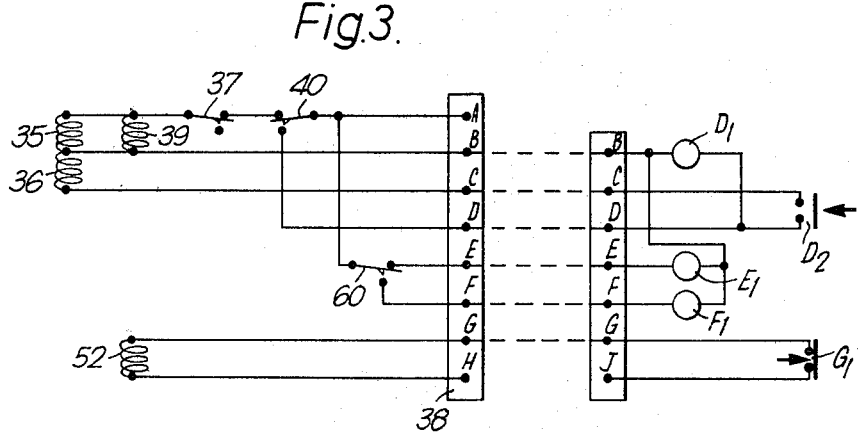
FIG. 3 is a circuit diagram of an electrical circuit incorporated in the mechanism of FIG. 2.

The mechanism shown in FIG. 1 incorporates the electrical circuitry of FIG. 3, the release sequence accordingly being effected through the use of a D.C. electro-magnet. When, during a resetting cycle, the main drive cam 12 rotates and the release crank 41 engaging therein also rotates, the release cam 43 is caused to rotate and bears against the armature link 49 to which armature 54 is pivoted by the armature pivot pin 53. This causes the armature 54 to be pressed against the electro-magnet 52 and to be retained by the magnetic field. At the same time, the release spring 56 is compressed and is retained in compression, thus storing energy.

On interruption of the D.C. electrical supply to the electro-magnet 52, energy is then transmitted from the release spring 56 via the release coupling link 47, to the L-shaped release lever 46, the latter being rotated in a clockwise sense viewing it from above as in FIG. 2.

Figure 5:
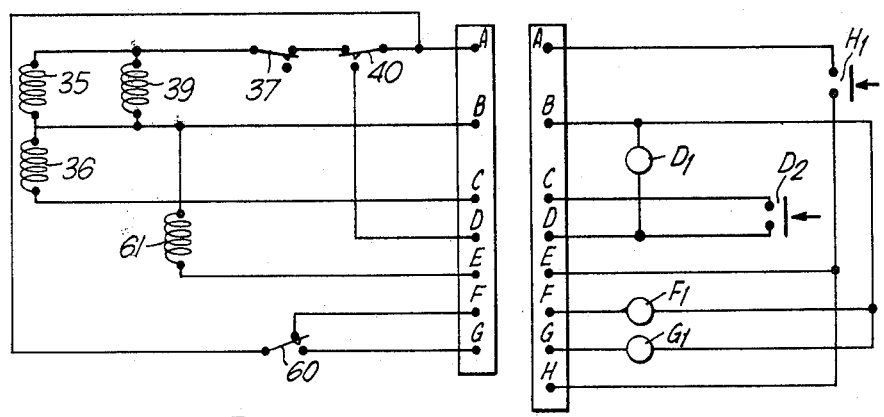
FIG. 5 is a circuit diagram of an electrical circuit incorporated in the mechanism of FIG. 2 as modified by FIG. 4.

The modified mechanism shown in FIG. 4 and its circuit of FIG. 5 contain an A.C. solenoid in place of the D.C. electromagnet of FIGS. 2 and 3. Accordingly, in a resetting cycle, the main drive cam 12 rotates the release cam 43 to bear against the armature link 49 and compress the release spring 56 until the shoulder of the release spring guide rod 63 engages the spring catch of the release spring guide bracket assembly 62 to retain the release spring 56 in compression, thus storing energy.

Pulse energisation of the release solenoid 61 causes the spring catch of the release spring guide bracket assembly 62 to be withdrawn from the release spring guide rod 63, allowing energy to be transmitted from the release spring 56 via the release coupling link 47, to the L-shaped release lever 46.

In both forms of construction, remote visual display indicator lamps to show the state of the spring motor dual functioning mechanism are energised through the remote visual display lamp micro-switch 60 attached to the bracket 59 mounted on the release operation base plate 1 and actuated by the armature link 49. Further, the spring of the mechanism can be manually rewound by means of the spring rewind key 29 and the resetting action manually initiated by pressing the manual override 32.

The mechanism described above in FIGS. 2 and 3, with or without the modification illustrated in FIGS. 4 and 5, is also suitable for pneumatic operation with the geared actuator 35 being air operated. In that event, the resetting solenoid 36, the clutch operating solenoid 39, the electro-magnet 52 or the release solenoid 61 will all be replaced by air cylinders, and the resetting micro-switch 37 and the spring overwind-prevention micro-switch 40 both replaced by air control valves.

The 24-volt D.C. electro-magnet release circuit shown in FIG. 3 has eight terminals A to H which have the following connections:

| Terminal | Connected to: |
| --- | --- |
| A | 220 volt A.C. live |
| B | 220 volt A.C. neutral |
| C | 220 volt A.C. pulse from remote master console ("damper-open" signal) |

| Terminal | Connected to: |
| --- | --- |
| D | 220 volt A.C. live, via microswitch 15, to actuator status amber neon lamp $D_1$ and damper opening switch $D_2$. |
| E | 220 volt A.C. live, via microswitch 16, to red neon light $E_1$ on master console ("damper-closed" position including functioning of fusible element) |
| F | 220 volt A.C. live, via microswitch 16, to green neon light $F_1$ on master console ("damper-open" position) |
| G | 24 volt D.C. positive supply from smoke detector via the master console damper close switch $G_1$ |
| H | 24 volt D.C. negative from smoke detector |
| J | 24 volt D.C. positive from smoke detector |

It is recommended, in practice, that the continuous supply to the electro-magnet be through a battery circuit and not through an automatic change-over system.

The 220-volt 50 HZ A.C. solenoid release circuit shown in FIG. 5 has eight terminals A to H which have the following connections:

| Terminal | Connected to: |
| --- | --- |
| A | 220 volt A.C. live |
| B | 220 volt A.C. neutral |
| C | 220 volt A.C. pulse from remote master console ("damper-open" signal) |
| D | 220 volt A.C. live, via microswitch 15, to actuator status amber neon light $D_1$ and damper opening switch $D_2$ |
| E | 220 volt A.C. ("damper-closed" signal) |
| F | 220 volt A.C. red neon light $F_1$ on master console ("damper-closed" position including functioning of fusible element) |
| G | 220 volt A.C. green neon light $G_1$ on master console ("damper-open" position). |
| H | 220 volt A.C. live from smoke detector to terminal E and damper closing switch $H_1$. |

Figure 6:
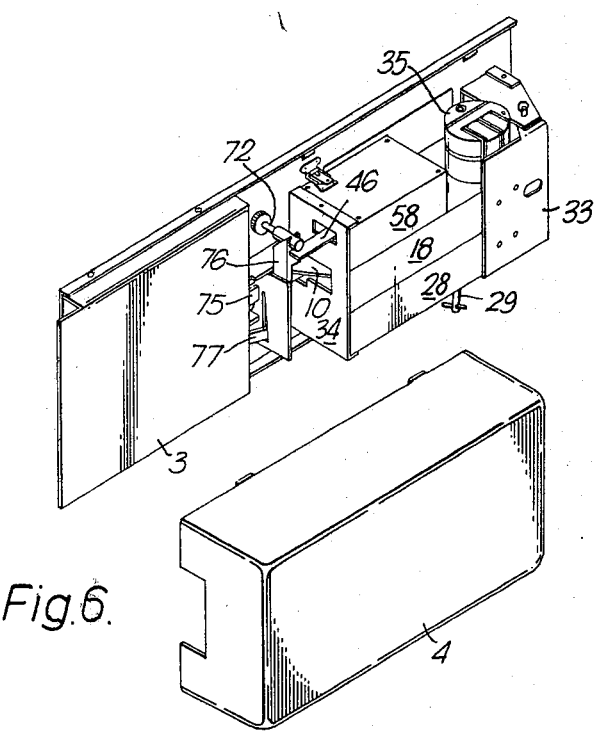
FIG. 6 is a perspective view of the mechanism shown in FIG. 1 but with the housing cover of the mechanism removed.

FIGS. 1 and 6 illustrate the application of the mechanism illustrated in FIGS. 2 to 5 to the operation of the fire and/or smoke damper 2 arranged in the air duct 1 of a building or other structure. The blades of the damper 2 are releasable from a "rest" position by a fusible actuating cartridge 72 if and when fire breaks out. By connecting the blade-rotating means (not shown) in the frame 6 to the mechanism of FIG. 2 mounted on the duct 1 through the linkage hidden behind the cover plate 3, the blades of the damper 2 may be automatically and remotely reset to their open position or released to their closed position, the fusible actuating cartridge 72 being over-ridden for release of the damper blades. The resetting operation is brought about by clockwise rotation of the plate 10 moving a rod 75 of the linkage to the right in FIG. 6. The rod 75 is connected to the damper to open its blades against the action of closing springs as the rod 75 moves to the right. The release operation is brought about by movement of the lever 46 towards the duct so as to depress a trigger 76 to lower a rod 77 of the linkage. This allows the closing springs of the damper to snap the blades shut whilst quickly moving the rod 75 back to the left. While the blades will normally be open to permit the passage of air through the damper, the damper can also be supplied for reverse operation so that the blades are normally closed and spring-loaded to open, on being actuated by the fusible actuating cartridge 72, to permit smoke evacuation through an internal smoke-release shaft of the building.

The spring motor storage power is such that it provides, with a variable and powerful force-torque at a governed rate and in a minimum space, at least two complete damper-blade resetting operations, even in the event of actuator failure, as the electric or pneumatic actuator of the mechanism only requires and uses power for automatic spring rewind, with spring motor clutch disengagement on rewind completion, or in the further event of actuator failure during the rewind cycle. The release operation is actuated through the energised D.C. electro-magnet 52 operating only when the 24 volt D.C. supply is interrupted either as a function of a smoke detection system or due to a supply failure, or through the de-energised A.C. solenoid 61 operating only on receipt of an electrical signal, or through a spring return air-cylinder operating only on pneumatic power loss.

As will be seen from FIG. 1, the compact, external, surface-mounted housing 4 totally encloses the complete mechanism assembly which is pre-wired or pre-piped, factory-tested and made ready for operation, with the supply terminals conveniently located, to provide the distinct safety advantage, when electrically actuated, of all electric components terminating outside the duct 1, thus eliminating the "in-duct" fire potential due to wiring faults. The mechanism also has the facilities of external manual override and key-operated external spring rewind for mechanical site commissioning including linkage connecting rods adjustment.

FIGS. 7 and 8 show how the mechanism is mounted on the side of a duct. A base plate 78 made with an inspection hatch 79 and provided with latch hooks 80 is mounted on the duct so that an inspection hatch (not shown) in the duct is in register with that in the base plate 78. A mounting frame 81 is fixed to the base plate 78 to the right of the inspection hatch in FIGS. 7 and 8, and the right hand cover 33 of the assembled mechanism is hinged to the mounting frame 81 by means of a pin 82 having a ring 83 at one end to aid removal. A terminal block 84 is held in the mounting frame 81, and connecting wires (not shown) extend from the block to various parts of the mechanism.

When the mechanism is positioned ready for operation, latches 85 on the release operation cover 58 and the lower chassis 28 engage the latch hooks 80 on the base plate 78, so that the housing base plate 30 is pressed in airtight manner against a fire resistant gasket 86 to seal the inspection hatch 79, the lever 46 is positioned adjacent to the trigger 76, and the resetting plate 10 is brought into engagement with the right hand end of the rod 75 of the linkage.

If the linkage and the damper are so designed that resetting of the damper is brought about by moving the rod 75 of the linkage to the left in FIGS. 7 and 8, the resetting operation of the mechanism would be such as to drive the resetting plate 10 anti-clockwise, out from the chassis 18. In this case, no connecting linkage is required between the plate 10 and the rod 75 since the former will push the latter, rather than pull it, during a resetting operation. It is therefore possible to inspect the mechanism, or gain access to the inspection hatch 79, merely by unfastening the latches 85 from their hooks 80, and swinging the mechanism outwardly about the pivot pin 82. Thus, without disconnection of the mechanical linkage or the electrical wiring, the spring-motor mechanism is pivotable through 180° to expose the inspection hatch 79 providing convenient access for duct inspection, if and whenever required. The spring-motor mechanism can be completely removed for repair work or replacement by using the ring 83 to lift the pin 82 clear from the mounting frame 81 and detaching push-on connectors (not shown) from the terminals of the block 84.

We claim:

1. In combination with a releasable and resettable device: a spring-motor dual-functioning mechanism comprising:
   (a) a D.C. magnet actuable to release the releasable and resettable device;
   (b) a spring motor actuable to reset the device, the spring motor storage power being sufficient for at least two complete resetting operations of said mechanism before rewinding of said spring motor mechanism is necessary;
   (c) spring-winding means actuable to rewind said spring motor;
   (d) a disengageable clutch through which said spring-winding means are drivingly coupled to rewind said spring motor;
   (e) a switch device connected and arranged to automatically disengage said clutch when said spring motor is fully wound;
   (f) electrical supply means connected to supply an electrical current to said D.C. magnet to hold the latter in a nonreleasing state, whereby said D.C. magnet is actuated when the holding electrical current ceases;
   (g) smoke detection means connected to said D.C. magnet to actuate the latter when smoke is detected by said detection means; and
   (h) a fusible element which is also arranged to release said releasable and resettable device, such release occurring when the element is fused, said fusible element and said D.C. magnet being arranged in relation to one another to cause release of said releasable and resettable device by said D.C. magnet to override said fusible element whilst leaving the latter still capable of subsequently effecting release on fusing.

2. In combination with inspection-hatch defining means, and a releasable and resettable device: a spring-motor dual-functioning mechanism comprising a D.C. magnet actuable to release the releasable and resettable device, electrical supply means connected to supply an electrical current to said D.C. magnet to hold the latter in a non-releasing state, whereby said D.C. magnet is actuated when the holding electrical current ceases, detection means connected to said D.C. magnet to actuate the latter when conditions indicative of a fire are detected by said detection means, said D.C. magnet also being actuated in the event of failure of said supply of an electrical current to said D.C. magnet, by said electrical supply means, a spring motor actuable to reset the device, and spring-winding means actuable to rewind said spring motor, the spring motor storage power being sufficient for at least two complete resetting operations of said mechanism before rewinding of said spring motor mechanism is necessary, said mechanism being mounted adjacent to said inspection hatch, to cover the latter in a pivotable manner whereby access can be gained to said hatch on pivoting the mechanism on its mount.

3. In combination with a releasable and resettable device: a spring-motor dual-functioning mechanism comprising a D.C. magnet actuable to release the releasable and resettable device, electrical supply means connected to supply an electrical current to said D.C. magnet to hold the latter in a non-releasing state, whereby said D.C. magnet is actuated when the holding electrical current ceases, detection means connected to said D.C. magnet to actuate the latter when conditions indicative of a fire are detected by said detection means, said D.C. magnet also being actuated in the event of failure of said supply of electrical current to said D.C. magnet, by said electrical supply means, a spring motor actuable to reset the device, and spring-winding means actuable to rewind said spring motor, the spring motor storage power being sufficient for at least two complete resetting operations of said mechanism before rewinding of said spring motor mechanism is necessary, in which said mechanism and said releasable and resettable device each have actuation members, those of the former being juxtaposed to those of the latter for actuation of said actuation members of said device by those of said mechanism thereby to allow the mechanism to be moved away from the releasable and resettable device for inspection without disconnection of said actuation members.

4. A mechanism according to claim 3, in which the releasable and resettable device is a fire and/or smoke damper.

5. A mechanism according to claim 4, in which the fire and/or smoke damper comprises blades which are normally in an open position but which are spring-loaded to close the damper.

6. A mechanism according to claim 4, in which the fire and/or smoke damper comprises blades which are normally positioned to close the damper but which are spring-loaded to open.

7. In combination with a releasable and resettable device: a spring-motor dual-functioning mechanism comprising a D.C. magnet actuable to release said releasable and resettable device, electrical supply means connected to supply an electrical current to said D.C. magnet to hold the latter in a non-releasing state, whereby said D.C. magnet is actuated when the holding electrical current ceases, detection means connected to said D.C. magnet to actuate the latter when conditions indicative of a fire are detected by said detection means, said D.C. magnet also being actuated in the event of failure of said supply of electrical current to said D.C. magnet, by said electrical supply means, a spring-motor actuable to reset the device, and a spring-winding means actuable to rewind said spring-motor, the spring-motor storage power being sufficient for at least two complete resetting operations of said mechanism before rewinding of said spring motor mechanism is necessary.

8. In combination with a releasable and resettable device: a spring-motor dual-functioning mechanism comprising a D.C. magnet actuable to release said releasable and resettable device, electrical supply means connected to supply an electrical current to said D.C. magnet to hold the latter in a non-releasing state, whereby said D.C. magnet is actuated when the holding electrical current ceases, detection means connected to said D.C. magnet to actuate the latter when conditions indicative of a fire are detected by said detection means, said D.C. magnet also being actuated in the event of failure of said supply of electrical current to said D.C. magnet, by said electrical supply means, a spring-motor actuable to reset the device, and a spring-winding means actuable to rewind said spring-motor, the spring-motor storage power being sufficient for at least two complete resetting operations of said mechanism before rewinding of said spring motor mechanism necessary, and a fusible element which is also arranged to release said releasable and resettable device, such release occurring when the element is fused.

9. A mechanism according to claim 8, in which said fusible element and said D.C. magnet are arranged in relation to one another to cause release of said releasable and resettable device by said D.C. magnet to override said fusible element whilst leaving the latter still capable of subsequently effecting release on fusing.

10. In combination with a releasable and resettable device: a spring-motor dual-functioning mechanism comprising a D.C. magnet actuable to release said releasable and resettable device, electrical supply means connected to supply an electrical current to said D.C. magnet to hold the latter in a non-releasing state, whereby said D.C. magnet is actuated when the holding electrical current ceases, detection means connected to said D.C. magnet to actuate the latter when conditions indicative of a fire are detected by said detection means, said D.C. magnet also being actuated in the event of failure of said supply of electrical current to said D.C. magnet by said electrical supply means, a resetting member which is moveable by the device when the latter is released, and a spring-motor connected to said resetting member and actuable to reverse the movement of the resetting member thereby to reset the device, spring-winding means actuable to rewind said spring-motor, the spring-motor storage power being sufficient for at least two complete resetting operations of said spring motor mechanism before rewinding of said spring motor mechanism is necessary, a disengageable clutch through which said spring-winding means are drivingly coupled to re-wind said spring-motor, and a switch device connected and arranged to dis-engage said clutch automatically when said spring-motor is fully wound.

* * * * *